United States Patent [19]

Pustovoit et al.

[11] 3,875,876

[45] Apr. 8, 1975

[54] SOIL APPLICATION OF FERTILIZERS AND AGRICULTURAL CHEMICALS AND DEVICE FOR EFFECTING THIS METHOD

[76] Inventors: Vasily Fedorovich Pustovoit, Rostovskaya ulitsa, 10, kv. 32; Viktor Mciseevich Bolotin, ulitsa Kievskaya, 121, kv. 27, both of Simferopol; Leonid Ignatievich Grom-Maznichevsky, Rizhskaya ulitsa, 63, kv. 1, Kiev; Alexandr Moiseevich Rozenberg, Rostovskaya ulitsa, 10, kv. 67; Alexei Ivanovich Driga, Stepnaya ulitsa, 39, both of Simferopol; Alexei Feodosievich Zhuk, Moscow; Alexandr Efimovich Pererva, Simferopol; Andrei Panteleevich Solomakhin, Simferopol; Mikhail Leibovich Vaisman, Simferopol, all of U.S.S.R.

[22] Filed: Aug. 17, 1973

[21] Appl. No.: 389,219

Related U.S. Application Data

[63] Continuation of Ser. No. 276,044, July 28, 1972, abandoned.

[52] U.S. Cl. .................... 111/1; 111/6; 222/193
[51] Int. Cl. ............................................ A01c 23/02
[58] Field of Search ............ 111/6, 7, 7.1, 7.2, 7.3, 111/7.4; 222/193

[56] References Cited

UNITED STATES PATENTS

| | | | |
|---|---|---|---|
| 2,930,334 | 3/1960 | Marron et al. | 111/6 |
| 2,988,025 | 6/1961 | Johnston | 111/6 |
| 3,012,526 | 12/1961 | Baldwin et al. | 111/6 |
| 3,303,800 | 2/1967 | Young | 111/7.1 |
| 3,405,669 | 10/1968 | Nimrick | 111/7.2 |
| 3,596,805 | 8/1971 | Farmery | 222/193 |
| 3,653,550 | 4/1972 | Williams | 222/193 X |
| 3,707,829 | 1/1973 | Siegel | 222/193 X |

*Primary Examiner*—Stephen C. Pellegrino
*Attorney, Agent, or Firm*—Holman & Stern

[57] ABSTRACT

A method for feeding a transporting liquid flow under pressure to create a recess in soil and using the liquid flow to carry fertilizers and chemicals in the solid state to the formed recess. A device for accomplishing the method comprises a pressure system for feeding the liquid under pressure from a tank through a pipeline having a nozzle. The pipeline is placed into a mixing chamber having loading and unloading ports and communicating with a bunker containing fertilizers and agricultural chemicals. The bunker is mounted on the frame of the device. The supply and cut-off of the liquid flowing through the nozzled pipeline is effected by means of a distributing valve.

8 Claims, 8 Drawing Figures

SOIL APPLICATION OF FERTILIZERS AND AGRICULTURAL CHEMICALS AND DEVICE FOR EFFECTING THIS METHOD

This is a continuation, of application Ser. No. 276,044, filed July 28, 1972, now abandoned.

BACKGROUND OF THE INVENTION

The present invention relates to the field of agriculture and, more particularly, the invention relates to methods of soil application of fertilizers and agricultural chemicals and to devices for effecting these methods.

This invention can be most successively used for soil dressing and treating plants with fertilizers and chemicals, wherein the fertilizers and chemicals are applied into the zone of the root system of the plant in non-dissolved form.

Methods are known in the art of soil application of fertilizers in a solution fed under pressure and forming a recess in the soil. Devices for effecting these methods are also known in the art.

In such know devices liquid fertilizer is fed at high pressure through a pipeline having a nozzle and forms a pit through which the fertilizer is applied into the soil.

In this case the liquid, as a rule, penetrates into deep layers of the soil, and only an insignificant portion of the fertilizer remains within the zone of the root system of the plant and is accepted thereby.

It is desirable, therefore, to apply non-dissolved fertilizers into the soil which can be introduced to a predetermined depth within the zone of the plant root system so that the periods between the operations of fertilizing may be prolonged.

Devices are also known in the art for soil application of dry granulated or powdery fertilizers and agricultural chemicals. In these devices the soil is opened mechanically, for example with the aid of a share; thereafter, the fertilizer is introduced. These devices are disadvantageous in that the mechanical treatment of the soil is frequently associated with damage to the root system of the plant.

SUMMARY OF THE INVENTION

An object of the present invention is to provide a method of soil application of fertilizers and agricultural chemicals and a device for effecting the method which would permit the introduction of non-dissolved granulated or powdery fertilizers and agricultural chemicals into the soil directly within the zone of the root system of a plant without effecting damage thereto.

According to this and other objects, a method is provided for soil application of fertilizers and agricultural chemicals using a flow of liquid under a pressure providing for a recess in the soil, so that the fertilizers and agricultural chemicals may be introduced into the soil in the solid state, while the flow of liquid is used as a carrier.

The device for effecting the above method comprises a pipeline having a nozzle which, according to the invention, is placed into a mixing chamber having loading and unloading ports and communicating with a bunker for fertilizers and agricultural chemicals mounted on the frame of the device, in which case the liquid fed through the nozzled pipeline is controlled by means of a distributing valve.

Such a solution of the problem permits the application of solid fertilizers and agricultural chemicals directly into the zone of the root system of a plant without damaging effecting damage thereto.

According to one embodiment of the invention the distributing valve is controlled through a lever system by a probe opening and closing the distributing valve during the movement of the device along the area being treated and upon contact of the probe with obstacles in its path.

In this case fertilizers and agricultural chemicals are introduced directly into the zone of the root system of a plant through the recess created by the flow of liquid.

It is expedient that the nozzled pipeline for mounted in the mixing chamber so as to be capable of movement along its axis and provided with a spring having one end resting on a slotted washer secured on the pipeline and the other end resting on the bottom of a cup mounted on the mixing chamber, so that the pipeline, when free from the liquid flow, closes the unloading port of the chamber under the action of the spring.

This prevents extra consumption of fertilizers and agricultural chemicals when the device passes through the space between succeeding plants.

It is also expedient that the nozzled pipeline is equipped with a flap which while moving together with the pipeline closes the loading port of the mixing chamber under the reaction of the flow of liquid.

This preferred design makes it possible to dose the amount of fertilizers or agricultural chemicals which must be introduced into the root system of a single plant and thus eliminate wastage.

According to one modification of the invention, the mixing chamber may be composed of two parts which are telescopically connected to each other for changing the volume of the chamber.

In the given example this joint is threaded. By changing the volume of the chamber, it is possible to increase or to reduce the dose of fertilizers or agricultural chemicals introduced into the root system of a single plant.

Another embodiment of the invention consists in that the mixing chamber is surrounded by a casing forming an annular space to be filled with liquid from the pumping unit, the liquid being fed into the mixing chamber through openings in its wall for mixing with a bulk material (fertilizers or agricultural chemicals).

Still another embodiment of the invention consists in that the pipeline nozzle is provided with passages in its side walls communicating the space of the mixing chamber with the space of the pipeline.

In this case the liquid is mixed with the loose material (fertilizers or agricultural chemicals) directly within the space of the mixing chamber and the latter is applied into the soil together with the flow of liquid.

DESCRIPTION OF THE INVENTION

The invention is further described by way of example with reference to the accompanying drawings, in which.

DETAILED DESCRIPTION OF PREFERRED EMBODIMENTS

The method of soil application of fertilizers and agricultural chemicals according to the invention is substantially intended for perennial plants and consists in the following.

The fertilizers and agricultural chemicals are applied into the soil in a solid state by a transporting flow of liquid fed under a high pressure. The pressure of the liquid flow depends on the quality of the fertilizers being applied and on the required depth of their penetration. In the given example the pressure of the liquid flow is equal to 100–180 atm.

The flow of liquid forms a pear-shaped recess in the soil which is filled with the liquid, so that on the soil surface an opening is formed whose diameter is equal to that of the liquid flow. In our example this diameter is equal to 10–15 mm.

In the embodiment of the invention under consideration the device provides for application of 100–150 grams of fertilizers (granulated superphosphate) to a depth of 40–50 cm at liquid consumption of 1 to 1.2 litre.

Figure 1:
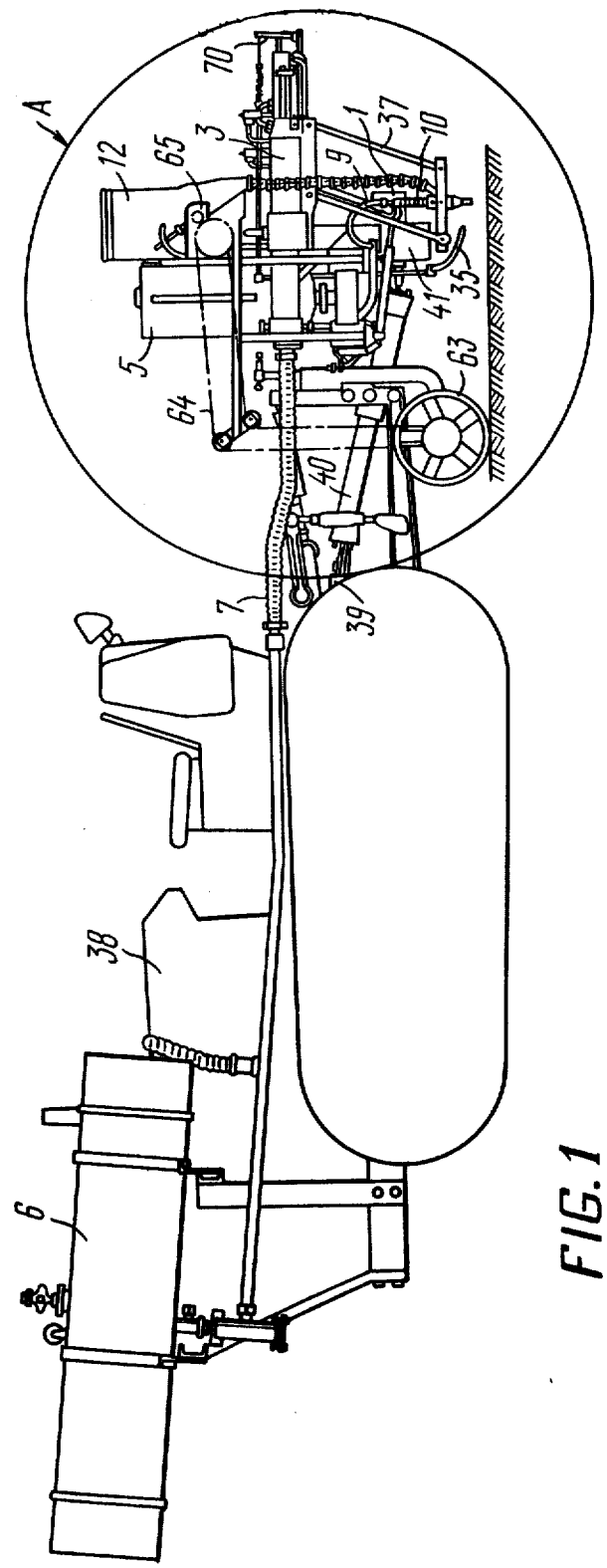
FIG. 1 is a general view of the device for soil application of fertilizers and agricultural chemicals.

The device for soil application of fertilizers and agricultural chemicals according to the above method comprises a pressure system for supplying the liquid under pressure and including (FIG. 1) a gear pump 1, a filter 2, a pressure transformer 3, a distributing valve 4, and an oil tank 5.

These components are interconnected through a system of pipelines.

The pressure system also includes a tank 6 for transporting liquid (water), a pipeline 7 communicating the tank 6 with the pressure transformer 3, and a non-return valve 8. The pressure transformer 3 through a flexible hose 9 is connected to a pipeline 10 designed for injection of the liquid into the soil. The pipeline 10 is placed into a mixing chamber 11 communicating with a bunker 12 for dry fertilizers and agricultural chemicals.

Figures 5, 6:
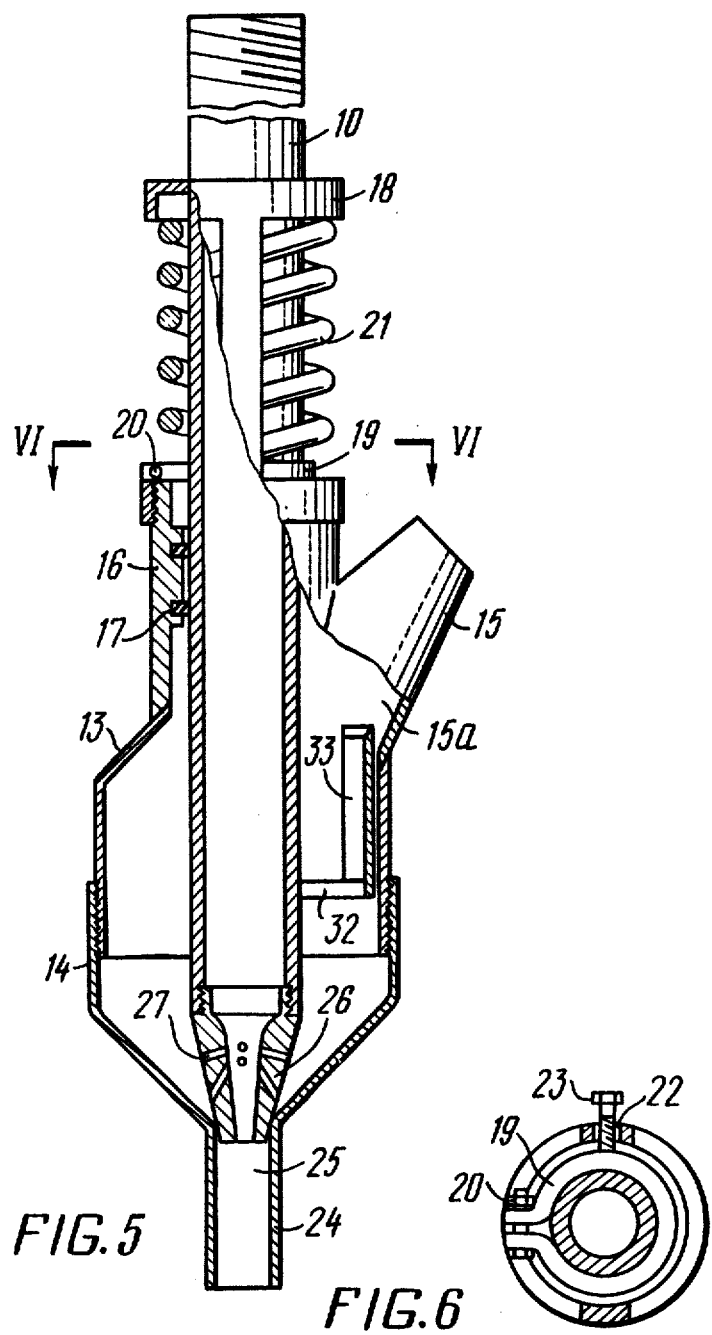
FIG. 5 is a partial longitudinal section of the mixing chamber.
FIG. 6 is a sectional view taken along the line VI—VI in FIG. 5.
Figure 7:
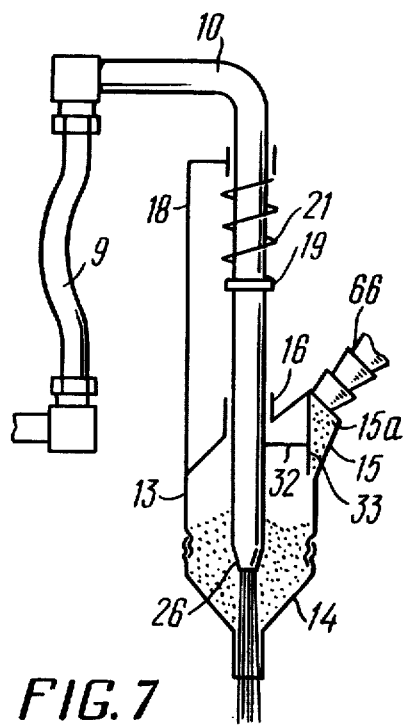
FIG. 7 is a diagram of operation of the mixing chamber (a modification)
Figure 8:
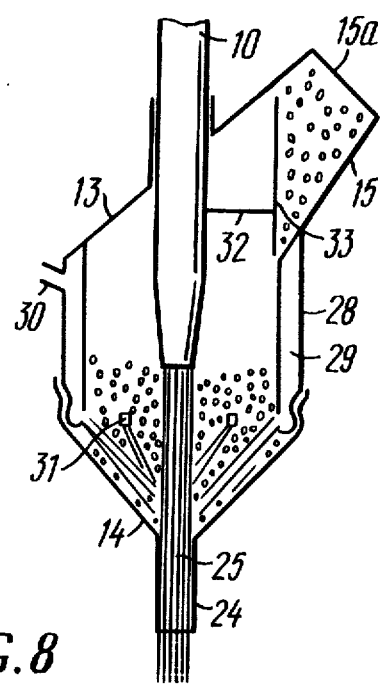
FIG. 8 is a diagram of operation of the mixing chamber (another modification).

The mixing chamber 11 (FIG. 2) is a tank formed by two telescopically connected parts; upper 13 and lower 14. In the example under consideration this connection is made by means of a threaded joint. The upper portion 13 has a loading pipe branch 15 with a port 15a, a guide sleeve 16 with a sealing 17 accommodating the pipeline 10. Threaded to the sleeve 16 is a cup 18 with a split washer 19 which is fixed on the pipeline 10 in a specified position by means of a bolt 20 (FIG. 5). Placed into the cup 18 is a spring 21 one end of which bears upon the washer 19 and the other end thereof rests of the bottom of the cup 18. The pressure of the spring 21 is adjusted by the washer 19. Made in the wall of the cup 18 is a longitudinal slot 22 (FIG. 6) in which is placed a locator 23 preventing the pipeline 10 from rotation about its axis.

The lower part 14 of the chamber is conical and has a pipe branch 24 with an unloading port 25. The pipeline 10 terminates with a nozzle 26 having in its side walls channels 27 communicating the space of the mixing chamber 11 with the space of the pipeline 10. The diameter of these passages is selected depending on the diameter of the nozzle opening, and in the example under consideration the area of the openings of the channels is no higher than 0.10 of the area of the nozzle opening.

In another modification of the mixing chamber 11 its upper portion 13 is provided with a casing 28 forming with the mixing chamber 11 an annular space 29 which through a pipe branch 30 is connected to the pipeline 10, while in the wall of the mixing chamber 11 there are openings 31 connecting the space 29 with the space of the mixing chamber for feeding liquid therein.

The pipeline 10 is movable along its axis within the mixing chamber 11. On the portion of the pipeline 10 enclosed within the mixing chamber 11 on a bracket 32, there is mounted a flap 33 for closing the loading port of the pipe branch 15.

Connected to the pressure transformer 3 is a valve 34 serving to prevent the air at atmospheric pressure from entering the pressure transformer 3.

Connection and disconnection of the distributing valve 4 is effected through a system of levers upon the contact of the probe 35 with the plant being treated.

Figure 2:
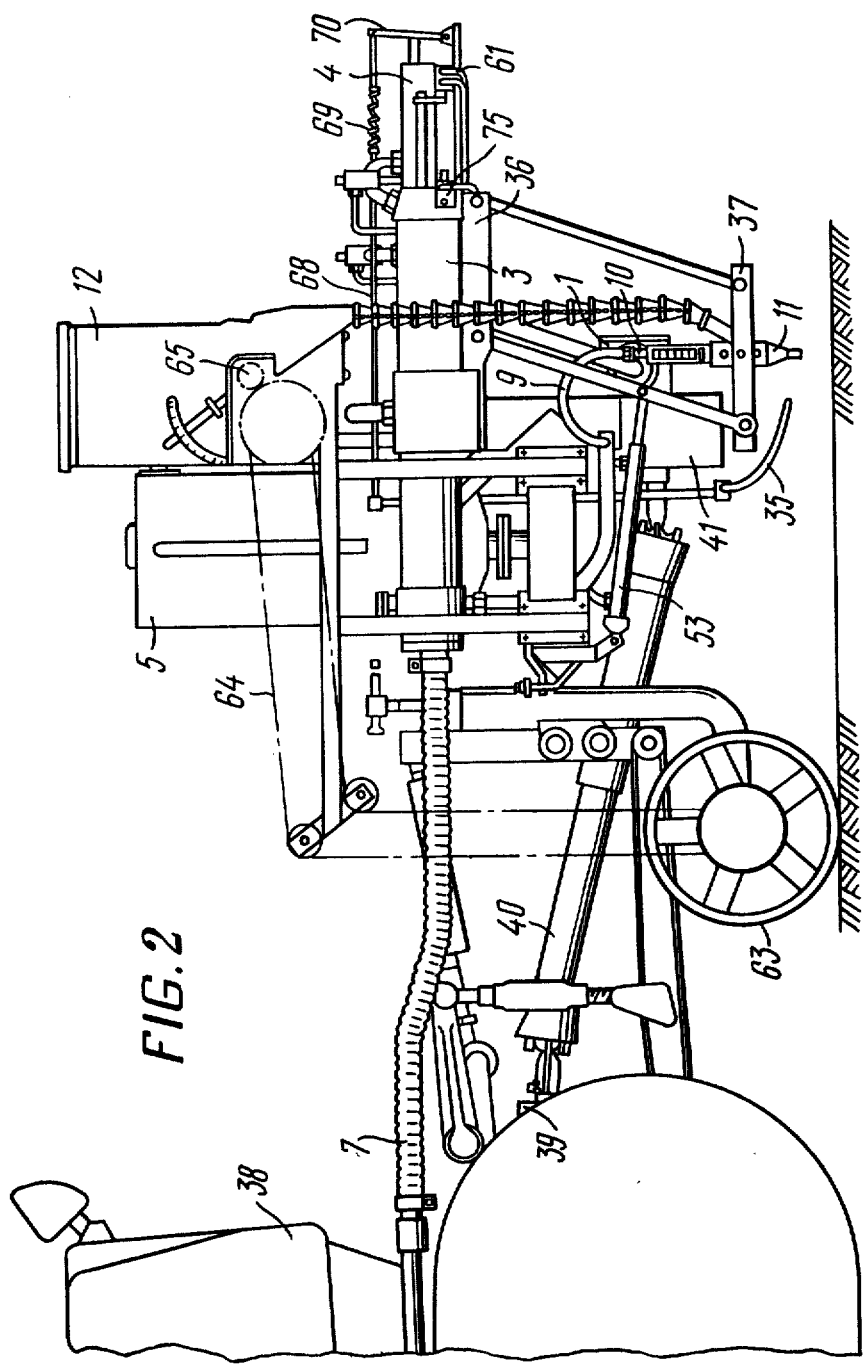
FIG. 2 is place "A" in FIG. 1 in an enlarged scale.
Figure 3:
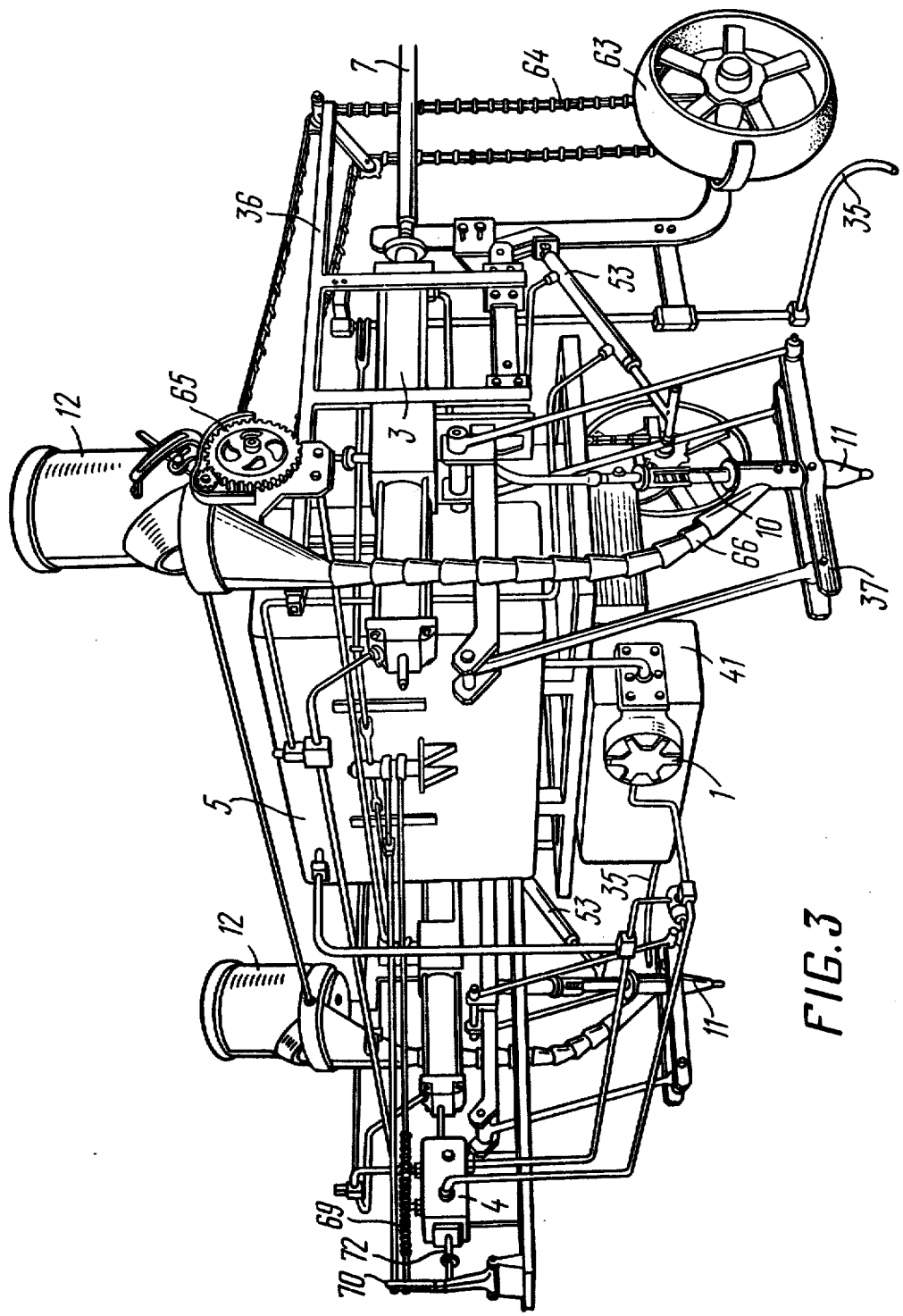
FIG. 3 is a general perspective view of the device for soil application of fertilizers and agricultural chemicals.
Figure 4:
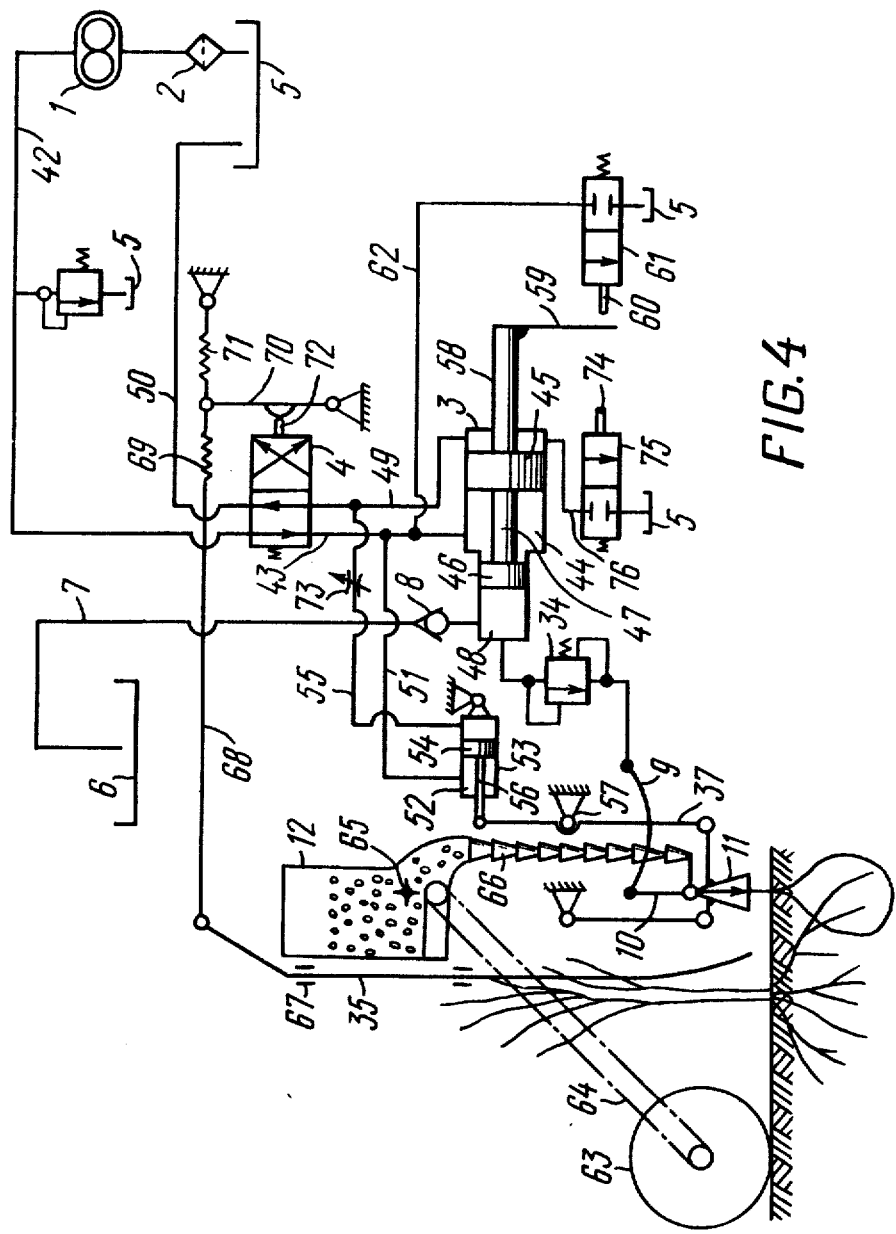
FIG. 4 is a principal diagram of operation of the device according to the invention.

All these units are mounted on a common frame 36 (FIG. 2). Hinged to the frame 36 is a mechanism 37 serving for synchronizing the motion of the mixing chamber 11 secured thereon with the device.

The device is made half-mounted and is combined with a tractor.

The proposed device operates as follows.

During the movement of the tractor 38 (FIG. 1) the torque from the power take-off shaft 39 through a cardan shaft 40 and a speed reducer 41 is transmitted to the gear pump 1 (FIG. 1) which feeds the oil along a pipeline 42 through the distributing valve 4 and a pipeline 43 into the chamber 44 of the pressure transformer 3. In this case the pistons 45 and 46 mounted on a rod 47 move to the right. A vacuum is created in a chamber 48, and the liquid is forced into this chamber from the tank 6 through the pipeline 7 and non-return valve 8.

At the same time the oil from the right-hand portion of the chamber 44 through a pipeline 49, the distributing valve 4, and a pipeline 50 is forced into the tank 5.

At the same time, the oil from the pipeline 43 is forced through a pipeline 51 into the space 52 of a hydraulic cylinder 53, in which case the piston 54 displaces the oil from the right-hand portion of the space 52 into the pipeline 49 through a pipeline 55.

The rod 56 turns the vertical link of the mechanism 37 about the rotation axis 57, thus shifting the matching mechanism in the direction of movement of the device.

At the extreme right-hand position of the piston 45 the tail 58 with a lever 59 presses the rod 60 of an end switch 61 and admits the oil to leave the chamber 44 and to flow into the oil tank 5 through a pipeline 62.

During the movement of the tractor 38 the rotation of the supporting wheel of the device through a chain drive 64 is transmitted to the dosing mechanism 65 of the bunker 12. The dry fertilizers or agricultural chemicals through a guide 66 and the loading pipe branch 15 are fed into the mixing chamber 11.

As soon as the probe 35 contacts a plant, it turns in the bearings 67 and through a rod 68 and a safety spring 69 rotates a lever 70 overcoming the resistance of a spring 71.

The lever 70 presses on the rod 72 of the distributing valve 4, and the latter directs the oil flow so that it is forced by the pump 1 through the pipeline 42 into the pipeline 49 and then into the right-hand portion of the chamber 44 of the pressure transformer 3, thereby shifting the pistons 45 and 46 to the left. In this case the piston 46 displaces the fluid from the chamber 48 and forces it under pressure through the valve 34 and the flexible hose 9 into the pipeline 10 positioned in the mixing chamber 11; thereafter, the fluid is injected through the nozzle 26 (FIG. 5).

When the flow of fluid appears in the pipeline 10, the latter is acted on by the reaction of this flow and moves upwards overcoming the resistance of the spring 21 and opening the unloading port 25, while the flap 33 closes the loading port 15a of the mixing chamber 11.

The flow of liquid carries the particles of fertilizers into the recesses in the soil. While the liquid is being fed into the pipeline 10, the oil from the pipeline 49 through a throttle 73 is supplied to the right-hand portion of the space 52 of the hydraulic cylinder 53 displacing the oil from the left-hand portion of the space 52 and directing it through the pipeline 51 and into the pipeline 43.

The rod 56 turns the vertical link of the mechanism 37 about the axis 57 of rotation, thus displacing the matching mechanism to the side opposite to the direction of movement of the device at such a speed that the mixing chamber 11 remains stationary relative to the soil.

In the extreme left-hand position of the piston 45 the tail 58 and a lever 59 presses the rod 74 of the end switch 75 thereby allowing the oil to pass from the chamber 44 into the tank 5 through the pipeline 76.

After the supply of the liquid has been stopped, the pipeline 10 is actuated by the spring 21 and moves down closing the unloading port 25. In this case the flap 33 moving together with the pipeline 10 opens the loading port 15a of the mixing chamber 11.

After the probe 35 passes the plant, the lever 70 acted on by the spring 71 returns the probe 35 into the initial position.

At the same time the rod 72 of the distributing valve 4 is returned to its initial position, and the whole cycle of operation of the device is repeated.

We claim:

1. A method of soil application of fertilizers and agricultural chemicals with a high pressure jet of liquid which method comprises the steps of: forming a pear-shaped recess in the soil with the high pressure jet, said recess being formed in the zone of a plant root system; and utilizing the jet to transport the fertilizers and agricultural chemicals in a solid non-dissolved state to the recess simultaneously with the formation thereof.

2. A device for effecting the method of soil application of fertilizers and agricultural chemicals comprising in combination: a framed support mounted on a mobile vehicle; a tank for containing transporting liquid mounted on said framed support; pressure means mounted on said framed support for supplying the transporting liquid under pressure from said tank through a pipeline having a nozzled terminating portion to the soil; mixing chamber means mounted on said framed support for mixing the fertilizers and chemicals with the transporting liquid and having loading and unloading ports the latter being directed towards the soil, said mixing chamber means movably accommodating said pipeline the nozzled terminating portion of which engagably rests in said unloading port; a bunker for carrying the fertilizers and agricultural chemicals disposed above said mixing chamber means and communicating therewith through the loading port thereof; distributing means mounted on said framed support for controlling the flow of the transporting liquid passing through the nozzled terminating portion of said pipeline.

3. A device according to claim 2, in which said distributing means includes a valve which is controlled by means of a probe which opens and closes said valve in response to contacts of said probe with obstacles in the process of movement of said device over the surface of the soil being treated.

4. A device as claimed in claim 2, in which said pipeline is mounted within said mixing chamber means so as to be movable along the longitudinal axis thereof and is provided with a spring one end of which rests on a split washer secured on said pipeline and the other end rests on the bottom of a cup mounted in said mixing chamber means, said pipeline closing the unloading port of said mixing chamber means under the action of said spring in the absence of flow of the transporting liquid in said pipeline.

5. A device as claimed in claim 4 in which a flap is secured to said pipeline so that its upper edge is below the loading port of said mixing chamber means, said flap being capable of moving together with said pipeline under the action of the flow of the transporting liquid thus closing the loading port of said mixing chamber means.

6. A device as claimed in claims 5 in which said mixing chamber means is composed of two parts joined telescopically to provide for changing the volume of said mixing chamber means.

7. A device as claimed in claim 6 in which said mixing chamber means is provided with a casing forming an annular space to be filled with the transporting liquid supplied into said mixing chamber means through openings in its wall, said liquid being mixed with the fertilizers and agricultural chemicals.

8. A device as claimed in claim 6 in which the terminating nozzle portion of said pipeline has passages in its side walls, said passages permitting communication between said mixing chamber means and said pipeline.

* * * * *